(12) United States Patent
Nobes et al.

(10) Patent No.: US 6,864,436 B1
(45) Date of Patent: Mar. 8, 2005

(54) WIRELESS ELECTRONIC SCALE

(76) Inventors: Clayton Nobes, 4 Ainsdale Crescent, Reading (GB) RG30 3NG; Tracey Anne Nobes, 4 Ainsdale Crescent, Reading (GB) RG30 3NG ( * ) Notice: Subject to any disclaimer, the term of this patent is extended or adjusted under 35 U.S.C. 154(b) by 0 days.

(21) Appl. No.: 10/392,783

(22) Filed: Mar. 20, 2003

(51) Int. Cl.[7] ............................................. G01G 19/52
(52) U.S. Cl. ................... 177/25.13; 177/126; 177/142; 340/666
(58) Field of Search ..................... 340/666; 177/25.13, 177/25.16, 142, 126

(56) References Cited

U.S. PATENT DOCUMENTS

| | | | | |
|---|---|---|---|---|
| 1,883,496 | A * | 10/1932 | Berson | 177/142 |
| 2,924,443 | A * | 2/1960 | Townsend et al. | 177/142 |
| 3,187,826 | A * | 6/1965 | Traff | 177/142 |
| 3,782,486 | A * | 1/1974 | Kuhn et al. | 177/210 R |
| 3,949,822 | A * | 4/1976 | English et al. | 177/126 |
| 4,576,244 | A * | 3/1986 | Zeigner et al. | 177/245 |
| 4,605,080 | A * | 8/1986 | Lemelson | 177/4 |
| 4,969,112 | A * | 11/1990 | Castle | 702/173 |
| 5,955,705 | A * | 9/1999 | Germanton | 177/126 |
| 6,038,465 | A * | 3/2000 | Melton, Jr. | 600/407 |
| 6,369,337 | B1 * | 4/2002 | Machiyama et al. | 177/25.13 |
| 6,541,714 | B2 * | 4/2003 | Montagnino | 177/178 |
| 6,590,166 | B2 * | 7/2003 | Yoshida | 177/25.13 |
| 6,617,530 | B1 * | 9/2003 | Lin | 177/25.16 |

* cited by examiner

Primary Examiner—Randy W. Gibson

(57) ABSTRACT

A wireless electronic scale essentially comprises a pair of wirelessly connected modules, a weight sensor pad and a display that would function like a bathroom scale. The weight sensor pad is placed on the floor and measures the user's weight and the display is wall mounted to display the information.

2 Claims, 3 Drawing Sheets

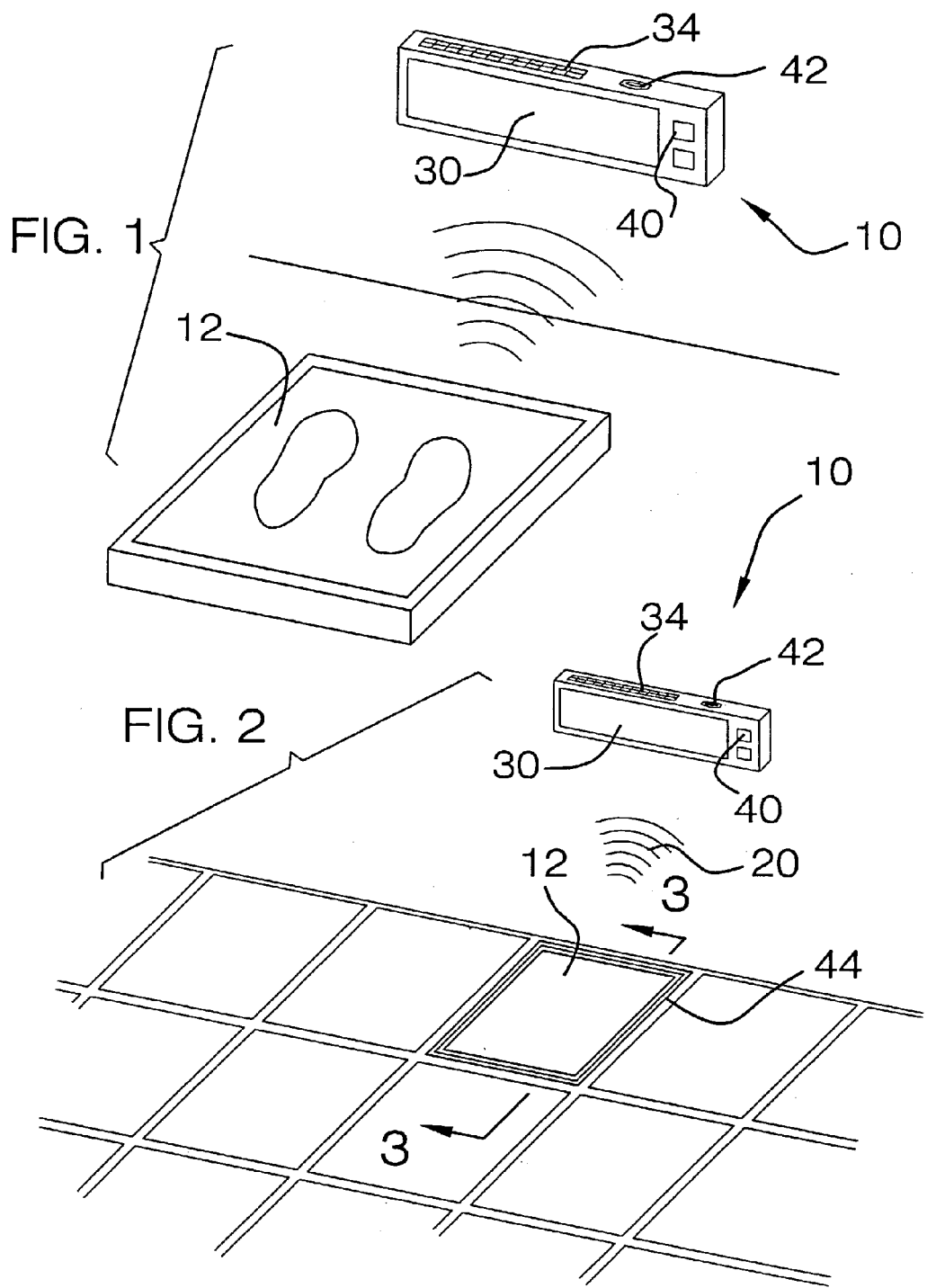

FIG. 3
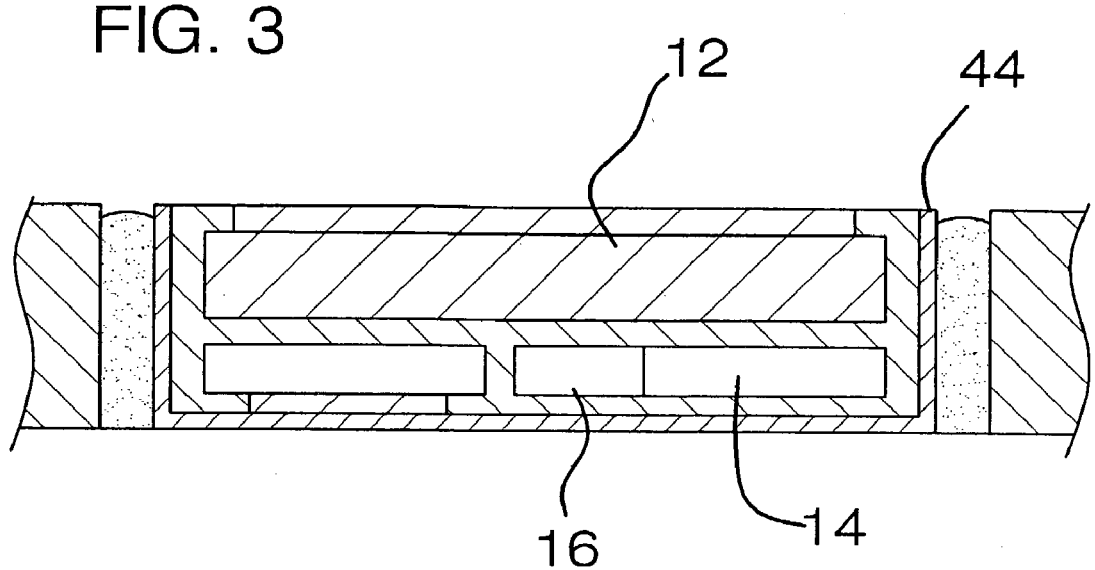
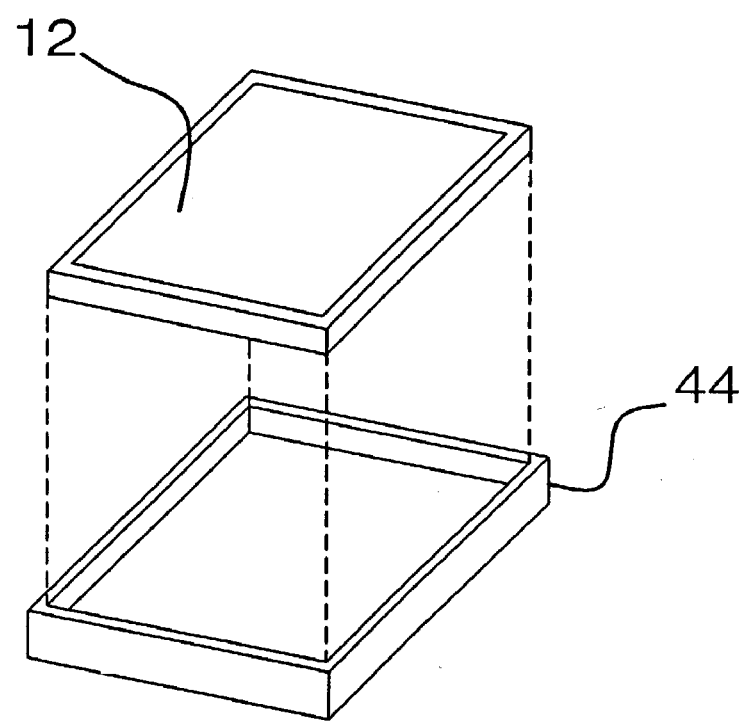
FIG. 4

WIRELESS ELECTRONIC SCALE

BACKGROUND OF THE INVENTION

1. Field of the Invention

The present invention relates to a wireless electronic scale for use in connection with electronic scales. The wireless electronic scale has particular utility in connection with electronic scales that can communicate wirelessly.

2. Description of the Prior Art

Wireless electronic scales are desirable for allowing a person to weigh himself or herself and view their weight without having to look down at the scales. A need was felt for an electronic scale that could take the place of a bathroom tile and that would communicate wirelessly with the display module. This scale would not take up floor space or have to be picked up and stored, and the display unit would be easily read at eye level.

The use of electronic scales is known in the prior art. For example, U.S. Pat. No. 4,773,492 to Ruzumana discloses an apparatus for promoting good health that conveys weight information including health-promoting messages based on departure of measured weight from ideal weight. Information relating to a particular person using the scale is contained in a cartridge in electronic form. The information comprises the person's ideal weight and messages related to the amount by which the person's measured departs from the ideal. The cartridge also contains provision for storing past weight measurements. When the person steps on the scale and selects his or her cartridge, weight information and messages are presented on a display screen which is a portion of a television receiver. A selector switch enables the apparatus to operate in the "Scale" mode and in the "TV" mode. However, the Ruzumana '492 patent does not include a floor tile weighing element capable of functioning as a personal scale having a remote display module which additionally displays motivational messages.

Similarly, U.S. Pat. No. 4,844,187 to Jabero discloses a future weight machine that will provide an individual with personal dietary information specifically tailored to the health needs of the particular individual. The apparatus includes means for determining the weight of the individual, including a weighting platform. The individual will manually enter data pertaining to the age, sex, and height as well as personal dietary restrictions. The apparatus includes means for processing and analyzing the data for the individual, and means for supplying dietary information pertaining to the individual. Another embodiment of the invention includes means for determining weight and the pulse rate of the individual, along with an exercise during aerobic exercise. The apparatus analyzes the data and supplies statistical information to the individual concerning the general physical condition of the individual. Both embodiments may contain means for storing the data pertaining to the individual, whereby the stored data is later recalled and used in providing information of the individual. However, the Jabero '187 patent does not include a floor tile weighing element capable of functioning as a personal scale having a remote display module which additionally displays motivational messages.

Lastly, U.S. Pat. No. 4,423,792 to Cowan discloses an electronic scale apparatus and method of controlling weight that provides weight control information, and a method of controlling weight which employs a scale apparatus. The apparatus comprises a scale member for measuring the weight of a person at a selected point in time. An electrical signal is generated in response to the measured weight. The apparatus further includes a memory for storing weight information. This weight information may include a base weight introduced previously into the memory. The apparatus includes an electronic circuit in which the generated signal is processed so that the weight of the person at the selected point in time can be compared against the base weight. This circuit also enables the calculation of a weight change based on the comparison. A display member is operatively connected to the electronic circuit for displaying the calculated weight and/or percentage of a weight change to a selected goal. The apparatus may be provided with a plurality of manually operable switches for introducing base weight information or other forms of weight related information. Moreover, the apparatus may be provided with a plurality of display members for simultaneously displaying various forms of weight related information. The method of the invention which may utilize the apparatus, enables an individual to measure the weight over selected periods of time, receiving reinforcement for achieving a weight change, or to take corrective action based on the weight changes. However, the Cowan '792 patent does not include a floor tile weighing element capable of functioning as a personal scale having a remote display module which additionally displays motivational messages.

While the above-described devices fulfill their respective, particular objectives and requirements, the aforementioned patents do not describe a wireless electronic scale that allows electronic scales that can communicate wirelessly. The Ruzumana '492, Jabero '187 and Cowan '792 patents make no provision for a floor tile weighing element capable of functioning as a personal scale having a remote display module which additionally displays motivational messages. Therefore, a need exists for a new and improved wireless electronic scale that can be used for electronic scales that can communicate wirelessly. In this regard, the present invention substantially fulfills this need. In this respect, the wireless electronic scale according to the present invention substantially departs from the conventional concepts and designs of the prior art, and in doing so provides an apparatus primarily developed for the purpose of electronic scales that can communicate wirelessly.

SUMMARY OF THE INVENTION

In view of the foregoing disadvantages inherent in the known types of electronic scales now present in the prior art, the present invention provides an improved wireless electronic scale, and overcomes the above-mentioned disadvantages and drawbacks of the prior art. As such, the general purpose of the present invention, which will be described subsequently in greater detail, is to provide a new and improved wireless electronic scale and method which has all the advantages of the prior art mentioned heretofore and many novel features that result in a wireless electronic scale which is not anticipated, rendered obvious, suggested, or even implied by the prior art, either alone or in any combination thereof.

To attain this, the present invention essentially comprises a weight sensor pad. A wireless transmitter is electrically connected to the weight sensor pad. The wireless transmitter is capable of transmitting a weight signal. A wireless receiver is capable of receiving the weight signal. An interface processor is electrically connected to the wireless receiver. A display is electrically connected to the interface processor.

There has thus been outlined, rather broadly, the more important features of the invention in order that the detailed description thereof that follows may be better understood and in order that the present contribution to the art may be better appreciated.

The invention may also include a scale processor, a transmitting antenna, a receiving antenna, an interface processor, a display driver, an audio driver, a speaker, a memory module, a data storage module, a user input, a microphone and an outer casing frame. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wireless electronic scale that has all of the advantages of the prior art electronic scales and none of the disadvantages.

It is another object of the present invention to provide a new and improved wireless electronic scale that may be easily and efficiently manufactured and marketed.

An even further object of the present invention is to provide a new and improved wireless electronic scale that has a low cost of manufacture with regard to both materials and labor, and which accordingly is then susceptible of low prices of sale to the consuming public, thereby making such wireless electronic scale economically available to the buying public.

Still another object of the present invention is to provide a new wireless electronic scale that provides in the apparatuses and methods of the prior art some of the advantages thereof, while simultaneously overcoming some of the disadvantages normally associated therewith.

Lastly, it is an object of the present invention is to provide a wireless electronic scale that could display motivational messages.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of a first embodiment of the preferred embodiment of the wireless electronic scale constructed in accordance with the principles of the present invention.

FIG. 2 is a top perspective view of a second embodiment of the wireless electronic scale of the present invention.

FIG. 3 is a section 3—3 view of FIG. 2 of the wireless electronic scale of the present invention.

FIG. 4 is an exploded view of the wireless electronic scale of the present invention.

The same reference numerals refer to the same parts throughout the various figures.

DESCRIPTION OF THE PREFERRED EMBODIMENT

Figure 5:
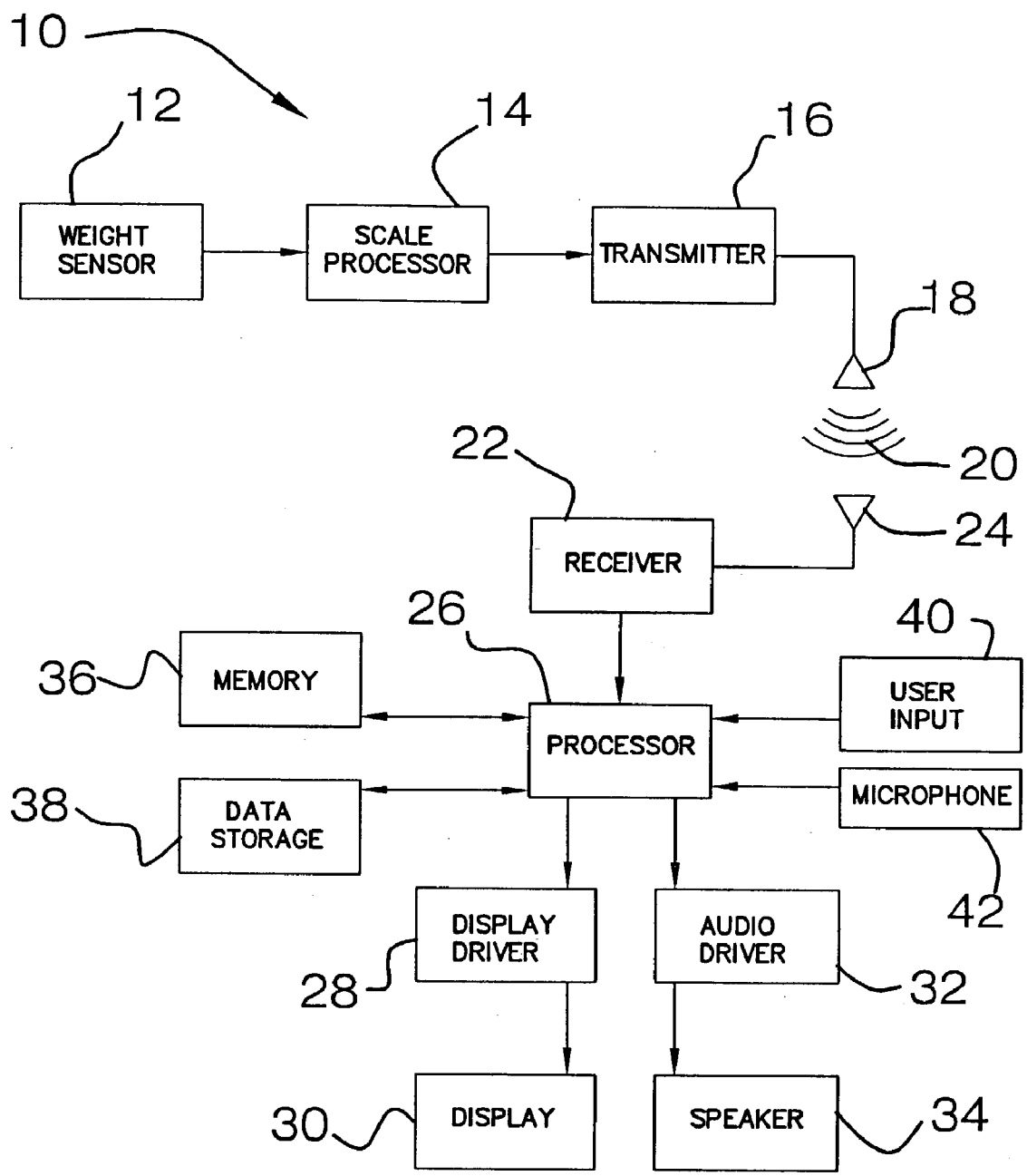
FIG. 5 is a block diagram view of the wireless electronic scale of the present invention.

Referring now to the drawings, and particularly to FIGS. 1-5, a preferred embodiment of the wireless electronic scale of the present invention is shown and generally designated by the reference numeral 10.

In FIG. 1, a new and improved wireless electronic scale 10 of the present invention for electronic scales that can communicate wirelessly is illustrated and will be described. More particularly, the wireless electronic scale 10 has the weight sensor pad 12. The display 30 is electrically connected to the interface processor 26 (shown in FIG. 5). The speaker 34 is electrically connected to the interface processor 26. The user input 40 is electrically connected to the interface processor 26. The microphone 42 is electrically connected to the interface processor 26.

In FIG. 2, the wireless electronic scale 10 is illustrated and will be described. The wireless electronic scale 10 has the weight sensor pad 12. The display 30 is electrically connected to the interface processor 26 (shown in FIG. 5). The speaker 34 is electrically connected to the interface processor 26. The user input 40 is electrically connected to the interface processor 26. The microphone 42 is electrically connected to the interface processor 26. The outer casing frame 44 connectable to the tile floor. The weight sensor pad 12 detachably connected to the outer casing frame 44.

In FIG. 3, the wireless electronic scale 10 is illustrated and will be described. The wireless electronic scale 10 has the weight sensor pad 12. The scale processor 14 is electrically connected to the weight sensor pad 12. The wireless transmitter 16 is electrically connected to the scale processor 14. The wireless transmitter 16 is capable of transmitting the weight signal 20. The outer casing frame 44 connectable to the tile floor. The weight sensor pad 12 detachably connected to the outer casing frame 44.

In FIG. 4, the wireless electronic scale 10 is illustrated and will be described. The wireless electronic scale 10 has the weight sensor pad 12. The outer casing frame 44 connectable to the tile floor. The weight sensor pad 12 detachably connected to the outer casing frame 44.

In FIG. 5, the wireless electronic scale 10 is illustrated and will be described. The wireless electronic scale 10 has the weight sensor pad 12. The scale processor 14 is electrically connected to the weight sensor pad 12. The wireless transmitter 16 is electrically connected to the scale processor 14. The wireless transmitter 16 is capable of transmitting the weight signal 20. The transmitting antenna 18 is electrically connected to the wireless transmitter 16. The wireless receiver 22 is capable of receiving the weight signal 20. The receiving antenna 24 is electrically connected to the wireless receiver 22. The interface processor 26 is electrically connected to the wireless receiver 22. The display driver 28 is electrically connected to the interface processor 26. The display 30 is electrically connected to the display driver 28. The audio driver 32 is electrically connected to the interface processor 26. The speaker 34 is electrically connected to the audio driver 32. The memory module 36 is electrically connected to the interface processor 26. The data storage module 38 is electrically connected to the interface processor 26. The user input 40 is electrically connected to the interface processor 26. The microphone 42 is electrically connected to the interface processor 26.

It can now be understood that the wireless electronic scale 10 is used as a conventional scale would be used.

While a preferred embodiment of the wireless electronic scale has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic may be used instead of the metal described. And although electronic scales that can communicate wirelessly have been described, it should be appreciated that the wireless electronic scale herein described is also suitable for discrete weight measurement of people passing over a weighing tile.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A wireless electronic scale comprising:

a weight sensor pad;

a wireless transmitter electrically connected to said weight sensor pad, said wireless transmitter capable of transmitting a weight signal;

a wireless receiver capable of receiving said weight signal;

an interface processor electrically connected to said wireless receiver;

a display electrically connected to said interface processor;

an outer casing frame connectable to a tile floor, said weight sensor pad detachably connected to said outer casing frame.

2. A wireless electronic scale comprising:

a weight sensor pad;

a scale processor electrically connected to said weight sensor pad;

a wireless transmitter electrically connected to said scale processor, said wireless transmitter capable of transmitting a weight signal;

a transmitting antenna electrically connected to said wireless transmitter;

a wireless receiver capable of receiving said weight signal;

a receiving antenna electrically connected to said wireless receiver;

an interface processor electrically connected to said wireless receiver;

a display driver electrically connected to said interface processor;

a display electrically connected to said display driver-, a memory module electrically connected to said interface processor;

a data storage module electrically connected to said interface processor;

a user input electrically connected to said interface processor; and an outer casing frame connectable to a tile floor, said weight sensor pad detachably connected to said outer casing frame.

* * * * *